United States Patent
Pattan et al.

(10) Patent No.: US 9,678,950 B2
(45) Date of Patent: Jun. 13, 2017

(54) SYSTEM AND METHOD FOR ENABLING COMMUNICATION BETWEEN A RICH COMMUNICATION SERVICE SYSTEM AND A NON-RICH COMMUNICATION SERVICE SYSTEM

(75) Inventors: Basavaraj Jayawant Pattan, Bangalore (IN); Venkateswar Jeedigunta, Bangalore (IN)

(73) Assignee: Samsung Electronics Co., Ltd (KR)

( * ) Notice: Subject to any disclaimer, the term of this patent is extended or adjusted under 35 U.S.C. 154(b) by 194 days.

(21) Appl. No.: 13/697,958

(22) PCT Filed: May 16, 2011

(86) PCT No.: PCT/KR2011/003585
§ 371 (c)(1),
(2), (4) Date: Nov. 14, 2012

(87) PCT Pub. No.: WO2011/142638
PCT Pub. Date: Nov. 17, 2011

(65) Prior Publication Data
US 2013/0066624 A1   Mar. 14, 2013

(30) Foreign Application Priority Data
May 14, 2010   (IN) .................. 1364/CHE/2010

(51) Int. Cl.
*G06F 17/28*   (2006.01)
*H04L 12/58*   (2006.01)
*H04M 3/533*   (2006.01)

(52) U.S. Cl.
CPC ........... *G06F 17/289* (2013.01); *H04L 12/583* (2013.01); *H04L 51/063* (2013.01); *H04M 3/533* (2013.01); *H04M 2203/2061* (2013.01)

(58) Field of Classification Search
CPC .... G06F 17/289; G06F 17/275; H04K 67/306
(Continued)

(56) References Cited

U.S. PATENT DOCUMENTS 6,687,736 B1 * 2/2004 Lee .................. G06F 9/4448
                                                     704/8
8,027,438 B2 * 9/2011 Daigle et al. .............. 379/88.06
(Continued)

FOREIGN PATENT DOCUMENTS

KR   1020050078732   8/2005
KR   1020060083485   7/2006
(Continued)

OTHER PUBLICATIONS

PCT/ISA/237 Written Opinion issued on PCT/KR2011/003585 (pp. 4).
(Continued)

*Primary Examiner* — Douglas Godbold
(74) *Attorney, Agent, or Firm* — The Farrell Law Firm, P.C.

(57) ABSTRACT

System and method for enabling communication between a Rich Communication Service System and a non-Rich Communication Service system. Embodiments of the present invention disclose a translation feature to enhance the communication experience between users of RCS and non-RCS systems by enabling users to communicate in their preferred language with the RCS taking care of language translation.

16 Claims, 9 Drawing Sheets

(58) Field of Classification Search
USPC .......................................................... 704/2–8
See application file for complete search history.

(56) References Cited

U.S. PATENT DOCUMENTS

| | | | | |
|---|---|---|---|---|
| 8,249,854 B2* | 8/2012 | Nikitin | .................. | G06F 17/289 704/2 |
| 8,386,233 B2* | 2/2013 | Khuda | ............................... | 704/3 |
| 8,452,603 B1* | 5/2013 | Liu | ...................... | G06F 17/289 704/260 |
| 8,566,864 B2* | 10/2013 | McClenny | ........... | G08B 27/005 340/286.02 |
| 8,838,437 B1* | 9/2014 | Buryak | .................. | G06F 9/4448 704/8 |
| 2001/0018649 A1* | 8/2001 | Kasai et al. | ...................... | 704/3 |
| 2005/0246156 A1* | 11/2005 | Scanlan | ........................... | 704/2 |
| 2006/0133585 A1* | 6/2006 | Daigle et al. | .............. | 379/88.06 |
| 2006/0271349 A1* | 11/2006 | Scanlan | ........................... | 704/2 |
| 2006/0271352 A1* | 11/2006 | Nikitin | .................. | G06F 17/289 704/9 |
| 2008/0126077 A1* | 5/2008 | Thorn | .................. | G06F 3/0237 704/8 |
| 2010/0138209 A1* | 6/2010 | Harrenstien | .......... | G06F 17/289 704/2 |
| 2010/0286977 A1* | 11/2010 | Chin | ...................... | G06F 17/289 704/4 |
| 2010/0305940 A1* | 12/2010 | Dendi | .................. | G06F 17/289 704/3 |
| 2011/0046939 A1* | 2/2011 | Balasaygun | ...................... | 704/2 |
| 2011/0111774 A1* | 5/2011 | Nyberg | ............... | G06F 17/2735 455/466 |
| 2011/0269477 A1* | 11/2011 | Annamalai et al. | ........ | 455/456.1 |
| 2011/0282645 A1* | 11/2011 | Khuda | ............................. | 704/3 |
| 2011/0282648 A1* | 11/2011 | Sarikaya et al. | .................. | 704/7 |
| 2012/0165048 A1* | 6/2012 | Zhu | ...................... | G06F 17/289 455/466 |

FOREIGN PATENT DOCUMENTS

| | | |
|---|---|---|
| KR | 100645110 | 11/2006 |
| KR | 100763839 | 10/2007 |

OTHER PUBLICATIONS

PCT/ISA/210 Search Report issued on PCT/KR2011/003585 (pp. 3).

Korean Office Action dated Feb. 20, 2017 issued in counterpart application No. 10-2012-7032821, 11 pages.

* cited by examiner

SYSTEM AND METHOD FOR ENABLING COMMUNICATION BETWEEN A RICH COMMUNICATION SERVICE SYSTEM AND A NON-RICH COMMUNICATION SERVICE SYSTEM

PRIORITY

This application is a National Phase Entry of PCT International Application No. PCT/KR2011/003585, which was filed on May 16, 2011, and claims priority to Indian Patent Application No. 1364/CHE/2010 filed in the Indian Intellectual Property Office on May 14, 2010, the contents of which are incorporated herein by reference.

BACKGROUND OF THE INVENTION

1. Field of the Invention

The present invention relates generally to communication systems, and more particularly, to value added services in communication systems.

2. Description of the Related Art

Different types of communication systems enable messaging between users. However, the language that is preferred by a first user (or sender) of a message may not necessarily be the same as that preferred by a second user (or receiver) of the message. With present communication systems, if the first user prefers communicating in English while the second user prefers communicating in Korean, a message sent by the first user will most probably be in English and the second user may have trouble understanding the message. The second user may have to use a translation tool to translate the message into Korean in order to understand the message.

The first user may instead request invocation of a translation tool for translation of messages before being delivered to the second user, when the first user is a subscriber of a Rich Communication Service (RCS). The first user may request translation of messages, irrespective of the capabilities of the network and user equipment at the second user's end. However, the first user has to make the request manually and should also be aware of the preferred language of the second user. A similar service is not available for messages delivered from the second user (which may be Korean, as described above) to the first user, if the second user is not an RCS user. The first user once again has to manually translate the message into his preferred language (which may be English, as described above).

SUMMARY OF THE INVENTION

The present invention has been made to address at least the above problems and/or disadvantages and to provide at least the advantages described below. Accordingly, an aspect of the present invention provides a method for translating messages sent between a user of an RCS and a non-RCS.

According to one aspect of the present invention, a method is provided for translating a message sent from a first user in an RCS to a second user in a non-RCS. A language of the message received from the first user is identified at a server in the RCS. The identified language is entered into a language history table with an entry of the first user. A preferred language of the second user is identified. The preferred language in the language history table is entered with an entry of the second user, when the preferred language is not present in the language history table. It is determined whether the identified language and the preferred language match. The message is sent from the server to the second user, when the identified language and the preferred language match. The message is sent from the server to a translator, when the identified language and the preferred language do not match. The message is translated into the preferred language at the translator. The translated message is sent from the translator to the server. The translated message is sent to from the server the second user.

According to another aspect of the present invention, a method is provided for translating a message sent from a first user in a non-RCS to a second user in an RCS. A language of the message received from the first user is identified at a server of the RCS. The identified language is entered into a language history table with an entry of the first user. A preferred language of the second user is identified. The preferred language is entered into the language history table with an entry of the second user, when the preferred language is not present in the language history table. It is determined whether the identified language and the preferred language match. The message is sent from the server to the second user, when the identified language and the preferred language match. The message is sent from the server to a translator, when the identified language and the preferred language do not match. The message is translated into the preferred language at the translator. The translated message is sent from the translator to the server. The translated message is sent from the server to the second user.

According to a further aspect of the present invention, a system is provided for translating a message sent between users in an RCS and a non-RCS. The system includes a server in the RCS for identifying a language of the message received from a first user, entering the identified language into a language history table with an entry of the first user, identifying a preferred language of a second user, entering the preferred language in the language history table with an entry of the second user when the preferred language is not present in the language history table, determining whether the identified language and the preferred language match, sending the message to the second user when the identified language and the preferred language match, and, when the identified language and the preferred language do not match, sending the message to a translator, receiving a translated message from the translator, and sending the translated message to the second user. The system also includes the translator for translating the message into the preferred language, and sending the translated message to the server.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The examples used herein are intended merely to facilitate an understanding of ways in which the embodiments of the present invention may be practiced and to further enable those of skill in the art to practice the embodiments of the present invention. Accordingly, the examples should not be construed as limiting the scope of the embodiments of the present invention. The embodiments of the present invention describe a translation feature to enhance the communication experience between users of RCS and non-RCS systems by enabling users to communicate in their preferred language with the RCS taking care of language translation. More specifically, embodiments of the present invention effectively provide a method for translating a message sent from a first user in an RCS to a second user in a non-RCS.

The language of the communication message sent from the second user is retained until the message reaches the messaging server, and is translated into another language before being delivered to the first user. In the reverse path, the communication message sent from the first user is translated into another language before being delivered to the second user via the interworking server and the social networking server.

In an embodiment of the present invention, a method and system is provided for determining whether there is need for translation at the RCS system, when content (e.g., voice, image, video, text, etc.) is received by the RCS system from a second user using a non-RCS system. If there is need for translation, the content is translated into a specified format. Details of translation are included as metadata along with the translated content during delivery of the translated content to the first user. Furthermore, translation instructions are included as metadata along with reply content when sending a reply from the first RCS user to the second non-RCS user.

It is also determined whether content is to be translated by the RCS system when the content is sent by first RCS user to the second non-RCS user. This determination is based on checking target user language preference using an Application Programming Interface (API) and checking the language preferences of the target user using a message history.

Figure 1:
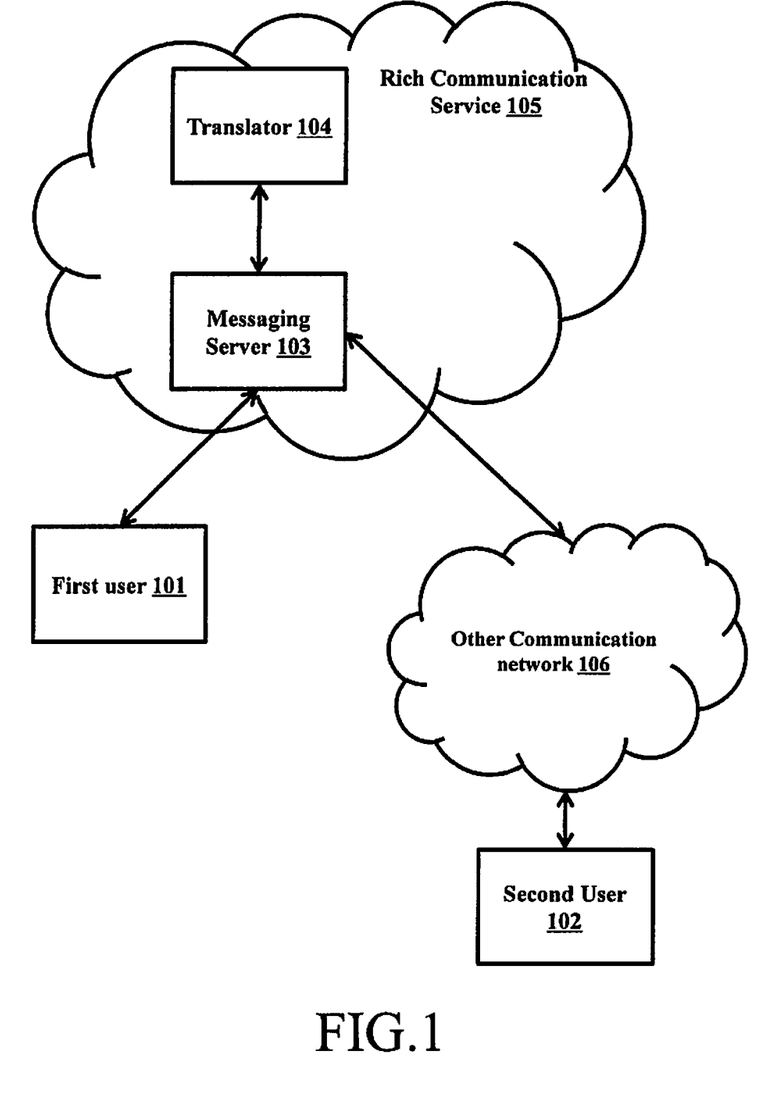
FIG. 1 is a diagram illustrating a system for enabling communication between RCS users and non-RCS users, according to an embodiment of the present invention.

FIG. 1 is a diagram illustrating a system for enabling communication between RCS users and non-RCS users, according to an embodiment of the present invention. The system, as depicted, includes a first user 101, an RCS system 105, a communication network 106 and a second user 102. The first user 101 is connected using a suitable means to the RCS 105. The first user 101 may access the RCS 105 using a suitable device such as, for example, a computer (a desktop, a portable computer), a mobile communication device, or a tablet. The device used by the first user 101 may connect using wired means or wireless means to the RCS 105. The RCS 105 is a network based on an Internet Protocol (IP) Multimedia Subsystem (IMS) for providing communication services to users. The RCS 105 includes a messaging server 103 and a translator 104. The RCS 105 is connected to the communication network 106, which is a non-RCS network. The second user 102 is connected to the communication network using a suitable connection device and means. The messaging server 103 makes various decisions while processing a received message, either from the first user 101 or from the second user 102. The messaging server 103 is also configured for interaction with the translator 104 for translating a message from one language to another.

In another embodiment of the present invention, a single module performs the functionalities of both the translator 104 and the message server 103.

Figure 2:
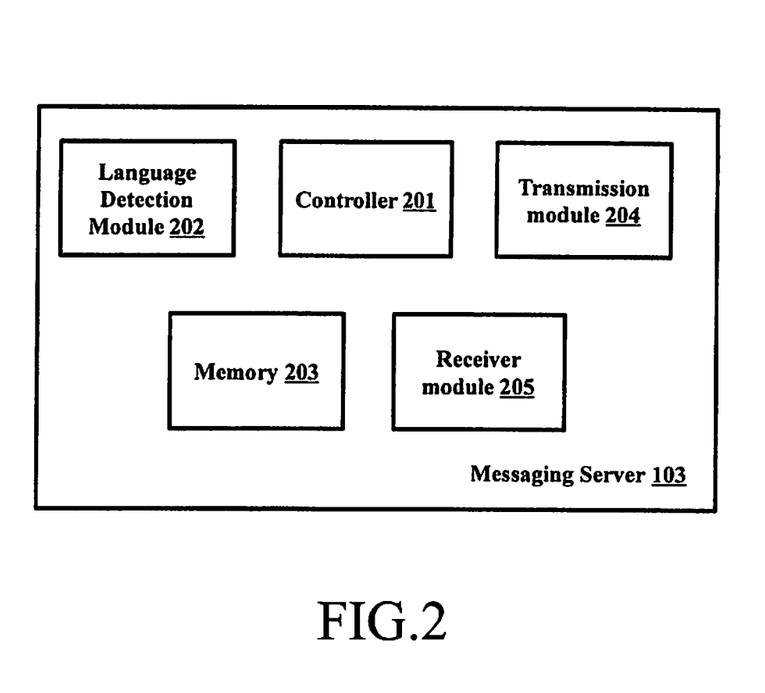
FIG. 2 is a diagram illustrating a messaging server, according to an embodiment of the present invention.

FIG. 2 is a diagram illustrating a messaging server, according to an embodiment of the present invention. The messaging server 103, as depicted, includes a controller 201, a language detection module 202, a memory 203, a transmission module 204 and a receiver module 205. The receiver module 205 receives a message from the first user 101, who is connected to the RCS 105. The received message may be text, video, audio or a combination of media types. The received message may be destined for the second user 102, who is connected to a non-RCS network. The message may be delivered using a communication request such as an SIP INVITE or a SIP MESSAGE. The receiver module 205 forwards the message to the controller 201. The controller 201, upon receiving the message, identifies the language used in the message with the help of the language detection module 202. The controller 201 uses a suitable means to identify the language, including the 'lang' parameter present in the message. The controller 201 determines if it has entries for the first user 101 and the second user 102 in a language history table. If it is the first time the two users are communicating; the table has no entry for these two users. The language history table is updated with the user identifiers of the first and second users and the language of the message. The controller 201 enters the identified language (say Lang1) into the language history table, as depicted in Table 1 below. The language history table may be stored by the controller 201 in the memory 203.

TABLE 1

| 1st User | Language of 1st User | 2nd User | Language of 2nd User |
| --- | --- | --- | --- |
| 1st User ID | Lang1 | 2nd User ID | |

The received message may contain instructions regarding the preferred language, which the second user 102 may want to view the message in. The instructions may be entered by the first user 101 (either manually or automatically), based on past interactions between the first user 101 and the second user 102. The controller 201 checks for the presence of the instructions. If the instructions are present, the controller 201 extracts the preferred language (Lang2) and enters it in the appropriate position in the language history table, as depicted in Table 2. The language history table may then be stored in the memory 203.

TABLE 2

| 1st User | Language of 1st User | 2nd User | Language of 2nd User |
|---|---|---|---|
| 1st User ID | Lang1 | 2nd User ID | Lang2 |

If the controller 201 does not detect any instructions in the message, the controller 201 checks if it may obtain the preferred language of the second user 102 using the history of the second user 102 with the help of the language detection module 202. This history may include mail sent to the second user 102 (either by the first user 101 or any other user), or mail sent by the second user 102 (either to the first user 101 or to any other user). The history of the second user 102 may be fetched from the memory 203. If the controller 201 can obtain the preferred language of the second user 102, the controller 201 enters the preferred language into the language history table, as depicted in Table 2 above. The language history table may then be stored in the memory 203.

If the controller 201 does not find any instructions or cannot obtain the preferred language of the second user 102 from the history, the controller 201 obtains the preferred language from the preferences of the second user 102 using an API, a Network to Network Interface (NNI), or any other suitable means. The controller 201 may use the language detection module 202 for obtaining the preferred language of the second user. Once the controller 201 obtains the preferred language of the second user 102 from the preferences of the second user 102, the controller 201 enters the preferred language into the language history table, as depicted in Table 2 above. The language history table may then be stored in the memory 203.

Once the language history table has been filled, the controller 201 compares the entries in the 'language of first user' field and the 'language of second user' field. If the controller 201 detects that the entries in the 'language of first user' field and the 'language of second user' field are the same, the controller 201 concludes that the message does not require translation. The controller 201 then forwards the message to the second user 102 using the transmission module 204.

If the controller 201 detects that the entries in the 'language of first user' field and the 'language of second user' field are not the same, the controller 201 concludes that the message requires translation from Lang1 to Lang2. The controller 201 then sends the message to the translator 104 using the transmission module 204, along with the appropriate instructions to enable the translator 104 to translate the message from Lang1 to Lang2. The transmission module 204 may set up a session (using an SIP INVITE), send a page mode message (using an SIP message), or use any other appropriate communication request for sending the message to the translator 104. Once the translator 104 has translated the message from Lang1 to Lang2, the translator 104 sends the translated message to the controller 201, via the receiver module 205, via an appropriate communication request, such as, for example, an SIP MESSAGE or an SIP INVITE message. The controller 201 then sends the translated message to the second user 102 via the transmission module 204. The controller 201 may also insert metadata into the message indicating that the message was translated from Lang1 to Lang2. In another embodiment herein, the controller 201 may insert text into the message indicating that the message was translated from Lang1 to Lang2. The controller 201 may also store information related to the message in the memory 203.

The receiver module 205 receives a message from the second user 102, who is connected to the non-RCS network 106. The received message may be text, video, audio or a combination of more than one media. The received message may be destined for the first user 101, who is connected to the RCS network 105. The receiver module 205 forwards the message to the controller 201. The controller 201, upon receiving the message, identifies the language used in the message. The controller 201 uses a suitable means to identify the language with the help of the language detection module 202, including the 'lang' parameter present in the message. The controller 201 checks the language history table to determine if it has entries for the first user 101 and the second user 102 involved in this message. If it is the first time the two users are communicating, the table will have no entries for these two users. The language history table is updated with the user identifier of the first and second user and the language of the message. The controller 201 enters the identified language (Lang2a) into the language history table, as depicted in Table 3 below. The language history table may be stored by the controller 201 in the memory 203.

TABLE 3

| 1st User | Language of 1st User | 2nd User | Language of 2nd User |
|---|---|---|---|
| 1st User ID | | 2nd User ID | Lang2a |

The controller 201 checks if the preferred language of the first user 101 is present in the language history table. If the controller 201 can obtain the preferred language of the first user 101 (Lang1a) from the language history table, the language history table appears as depicted in Table 4 below.

TABLE 4

| 1st User | Language of 1st User | 2nd User | Language of 2nd User |
|---|---|---|---|
| 1st User ID | Lang1a | 2nd User ID | Lang2a |

If the controller 201 does not detect the preferred language of the first user 101 in the language history table, the controller 201 determines if the preferred language of the first user 101 may be obtained from the preferences of the first user 101 using suitable means with the help of the language detection module 202. Once the controller 201 obtains the preferred language of the first user 101, the controller 201 enters the preferred language into the language history table, as depicted in Table 4 above. The language history table may then be stored in the memory 203.

Once the language history table has been filled, the controller 201 compares the entries in the 'language of first user' field and the 'language of second user' field. If the controller 201 detects that the entries in the 'language of first user' field and the 'language of second user' field are the same, the controller 201 concludes that the message does not require translation. The controller 201 then forwards the message to the first user 101 using the transmission module 204.

If the controller 201 detects that the entries in the 'language of first user' field and the 'language of second user' field are not the same, the controller 201 concludes that the message requires translation from Lang2a to Lang1a. The controller 201 then sends the message to the translator 104 using the transmission module 204, along with the appropriate instructions, to enable the translator 104 to translate the message from Lang2a to Lang1a. The transmission module 204 may set up a session (using an SIP INVITE), send a page mode message (using an SIP message), or use any other appropriate communication request for sending the message to the translator 104. Once the translator 104 has translated the message from Lang2a to Lang1a, the translator 104 sends the translated message to the controller 201 via the receiver module 205 using a communication request, such as, for example, an SIP INVITE or an SIP MESSAGE. The controller 205 then sends the translated message to the first user 101 via the transmission module 204. The controller 201 may also insert metadata into the message indicating that the message was translated from Lang2a to Lang1a. In another embodiment of the present invention, the controller 201 may insert text into the message indicating that the message was translated from Lang2a to Lang1a. The controller 201 may also store information related to the message in the memory 203.

The language history table, maintained by the messaging server 103, stores the languages used by each user and with each user during the communication between two or more users. The language history table can be expanded to include more details or can be optimized. For example, the table may include the following fields:

First User—one of the user IDs involved in the communication, e.g., RCS User.

Language of the first user—Language used by the user listed in the first user column.

Second User—other user ID involved in the communication, e.g., the non-RCS network user. When the communication is a group chat, this column will contain the user ID suffixed/prefixed by the group ID divided by a separator like underscore e.g. bob@example.com_geeks@example.com. In another embodiment of the present invention, the group ID can be a separate entry in the table.

Language of the second user—the language used by the user listed in second user column.

The values in the language history table are built based on the communication happening between two or more users. The language history table can be used for identifying whether translation of the message is required and also for determining the target language to which the message has to be translated to.

In another embodiment of the present invention, the second user may be a group of users. The language history table includes the identity of the group of users and the language preferred by the group, in addition to the identity of the first user and the language preferred by the first user.

Figure 3:
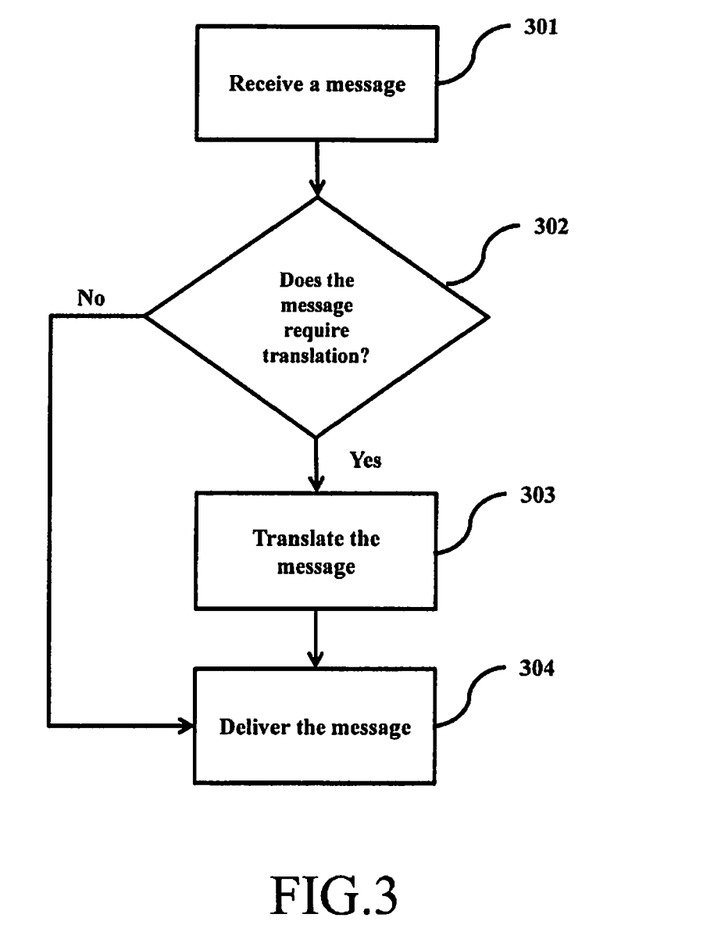
FIG. 3 is flowchart illustrating a process of communication between two users, according to an embodiment of the present invention.

FIG. 3 is a flowchart illustrating a process of communication between two users, according to an embodiment of the present invention. The messaging server 103 receives a message, in step 301. The message may be from the first user 101 or the second user 102. The messaging server 103 determines whether the message requires translation, depending on the language of the message and the preferred language for the first and second user, in step 302. If the message does not require translation, the messaging server 103 delivers the message to the destination, in step 304. If the message requires translation, the messaging server 103 translates the message using the translator 104, in step 303, and delivers the translated message to the destination, in step 304. The various actions of FIG. 3 may be performed in the order presented, in a different order, or simultaneously. Further, in some embodiments of the present invention, some actions listed in FIG. 3 may be omitted.

Figure 4:
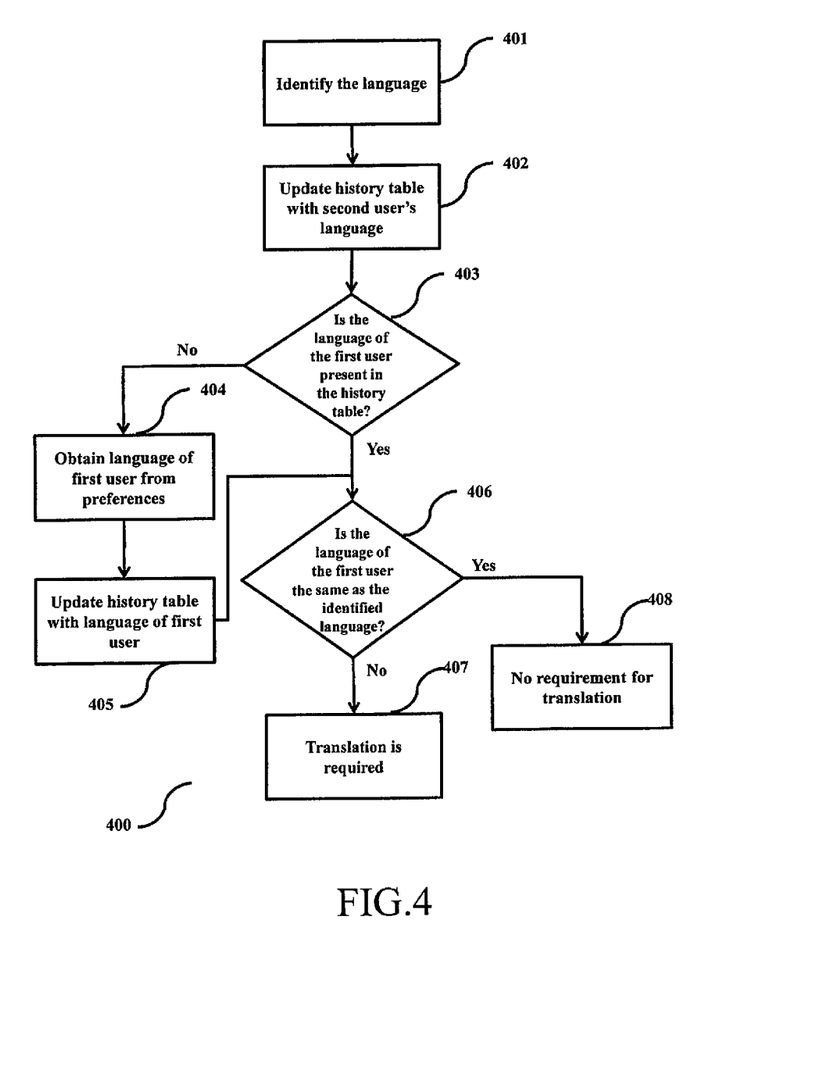
FIG. 4 is a flowchart illustrating a non-RCS user sending a message to an RCS user, according to an embodiment of the present invention.

FIG. 4 is a flowchart illustrating a non-RCS user sending a message to a RCS user, according to an embodiment of the present invention. The messaging server 103, upon receiving a message from the second user 102 destined for the first user 101, identifies the language used in the message, in step 401. The messaging server 103 uses a suitable means to identify the language, including the 'lang' parameter present in the message. The messaging server 103 enters the identified language (Lang2a) into the language history table, in step 402, as depicted in Table 3. The messaging server 103 determines whether the preferred language of the first user 101 is present in the language history table, in step 403. If the messaging server 103 does not detect the preferred language of the first user 101 in the language history table, the messaging server 103 obtains the preferred language of the first user 101 from the preferences of the first user 101 using suitable means, in step 404. Once the messaging server 103 obtains the preferred language of the first user 101, the messaging server 103 updates the preferred language into the language history table, in step 405, as depicted in Table 4. If the messaging server 103 detects the preferred language of the first user 101 in the language history table in step 403, or once the language history table has been updated in step 405, the messaging server 103 compares the entries in the 'language of first user' field and the 'language of second user' field, in step 406. If the messaging server 103 detects that the entries in the 'language of first user' field and the 'language of second user' field are the same, the messaging server 103 concludes that the message does not require translation, in step 408. If the messaging server 103 detects that the entries in the 'language of first user' field and the 'language of second user' field are not the same, the messaging server 103 concludes that the message requires translation, in step 407. The various actions in method 400 of FIG. 4 may be performed in the order presented, in a different order or simultaneously. Further, in some embodiments, some actions listed in FIG. 4 may be omitted.

Figure 5A:
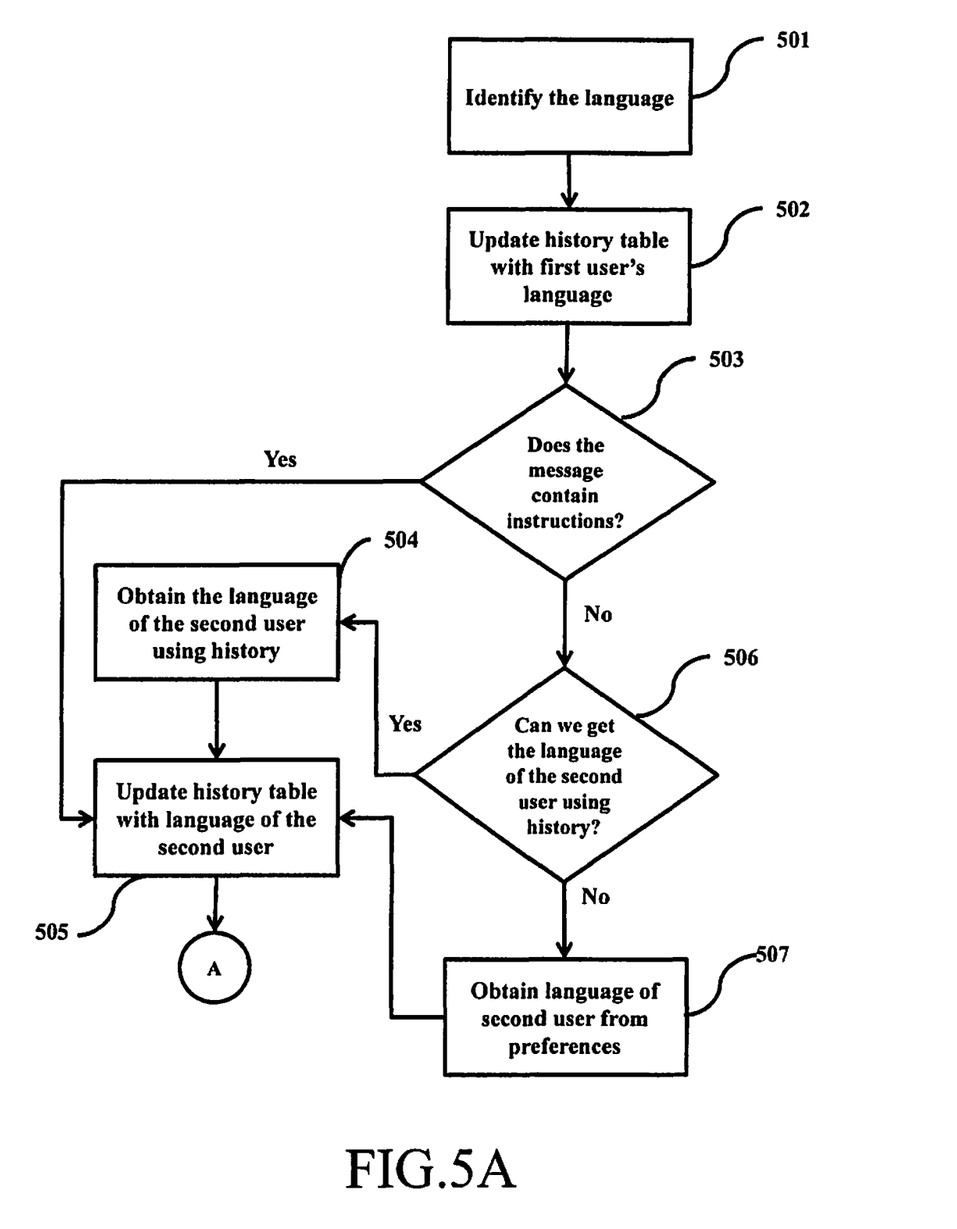
FIGS. 5A and 5B is a flowchart illustrating an RCS user sending a message to a non-RCS user, according to an embodiment of the present invention.
Figure 5B:
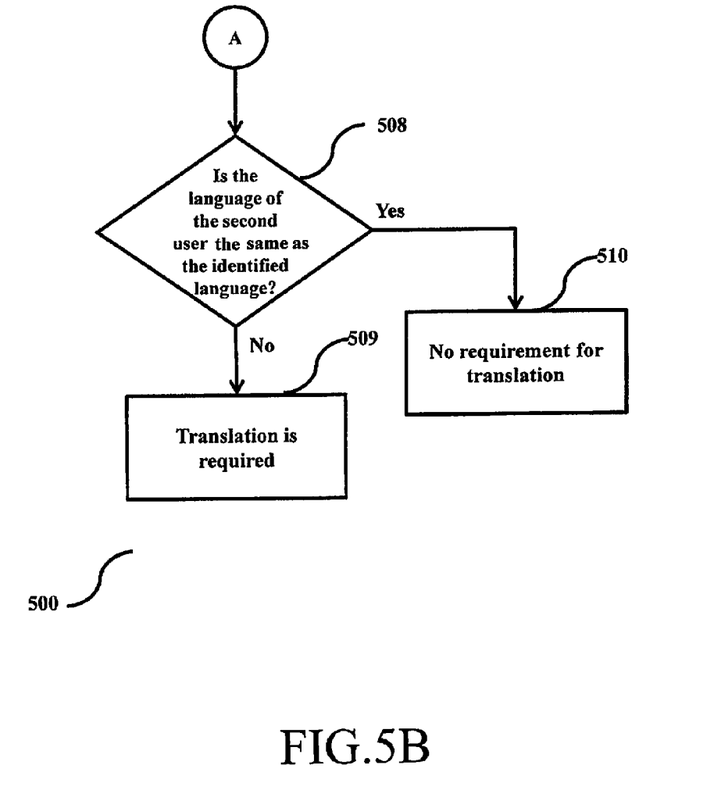

FIGS. 5A and 5B depict an RCS user sending a message to a non-RCS user, according to an embodiment of the present invention. The messaging server 103, upon receiving a message from the second user 102 destined for the first user 101, identifies the language used in the message, in step 501. The messaging server 103 uses a suitable means to identify the language, including the 'lang' parameter present in the message. The messaging server 103 enters the identified language (Lang2a) into the language history table, in step 502, as depicted in table 1. The controller 201 determines whether instructions regarding the preferred language, which the second user 102 may want to view the message in, are present, in step 503. If the instructions are present, the controller 201 extracts the preferred language (Lang2) and updates the language history table, in step 505, as depicted in Table 2. If the controller 201 does not detect any instructions in the message, the controller 201 determines whether the controller 201 can obtain the preferred language of the second user 102 using the history of the second user 102, in step 506. This history may include mail sent to the second user 102 (either by the first user 101 or any other user), or mail sent by the second user 102 (either to the first user 101 or to any other user). If the controller 201 can obtain the preferred language of the second user 102, the controller 201 obtains the preferred language of the second user, in step 504, and enters the preferred language into the language history table, in step 505, as depicted in Table 2. If the controller 201 does not find any instructions or cannot obtain the preferred language of the second user 102 from the history, the controller 201 obtains the preferred language from the preferences of the second user 102 using an API, an NNI, or any other suitable means, in step 507. Once the controller 201 obtains the preferred language of the second user 102, the controller 201 enters the preferred language into the language history table, in step 505, as depicted in table 2. Once the language history table has been filled, the controller 201 compares the entries in the 'language of first user' field and the 'language of second user' field to determine if the languages are the same, in step 508. If the controller 201 detects that the entries in the 'language of first user' field and the 'language of second user' field are the same, the controller 201 concludes that the message does not require translation, in step 510. If the controller 201 detects that the entries in the 'language of first user' field and the 'language of second user' field are not the same, the controller 201 concludes that the message requires translation, in step 509. The various actions in method 500 of FIGS. 5A and 5B may be performed in the order presented, in a different order or simultaneously. Further, in some embodiments, some actions listed in FIGS. 5A and 5B may be omitted.

Figure 6:
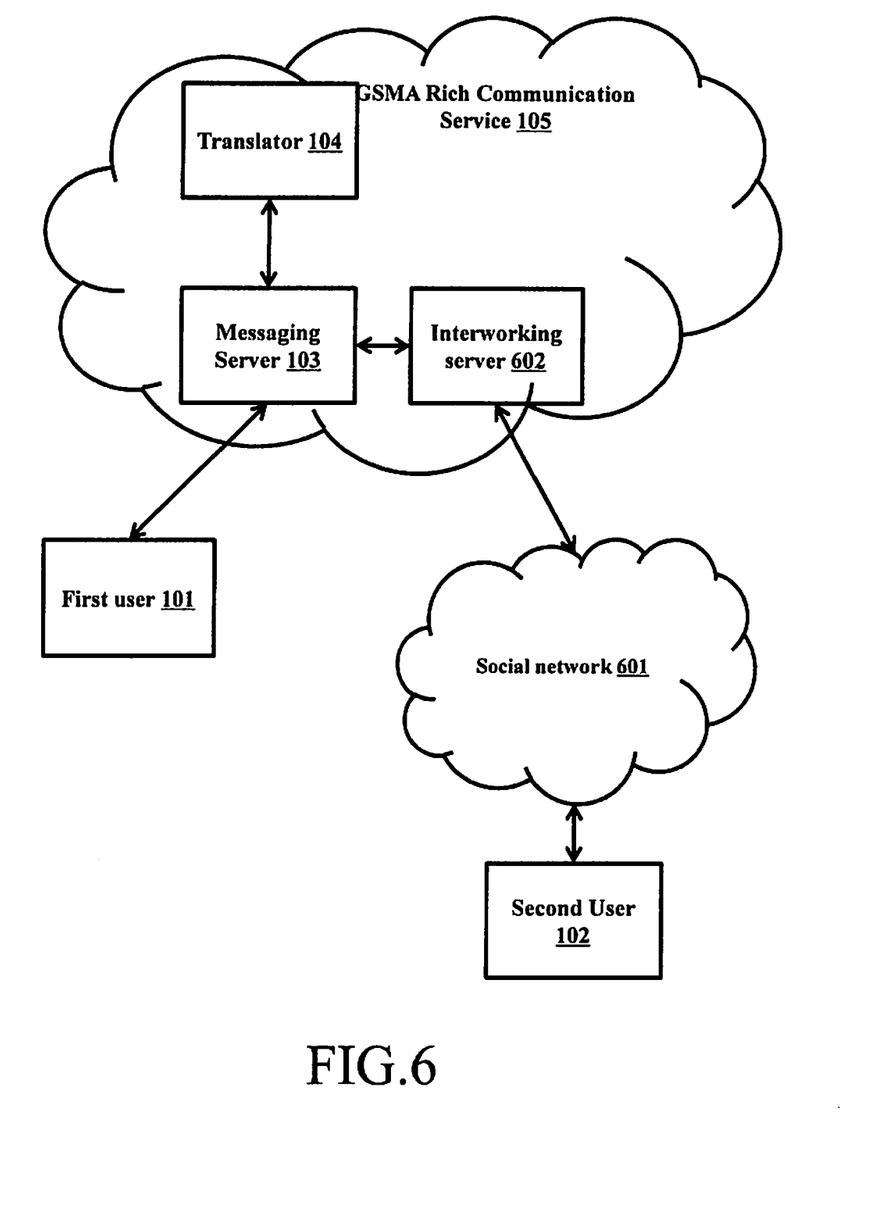
FIG. 6 is a diagram illustrating communication between a GSMA defined RCS and a social network, according to an embodiment of the present invention.

FIG. 6 is a diagram illustrating communication between a GSMA defined RCS and a social network, according to an embodiment of the present invention. The system, as depicted, includes the first user 101, the RCS system 105, the second user 102, and a social network 601. The first user 101 is connected using a suitable means to the RCS 105. The first user 101 may access the RCS 105 using a suitable device such as a computer (a desktop, a portable computer), a mobile communication device, or a tablet. The device used by the first user may connect using wired means or wireless means to the RCS 105. The RCS 105 includes the messaging server 103, the translator 104 and an interworking server 602. The RCS 105 is connected to the social network 601 (which is a non-RCS network). The social network 601 may be a network that enables users to interact with each other. The second user 102 is connected to the social network 601 using a suitable connection device and means. The messaging server 103 makes various decisions while processing a received message either from the first user 101 or from the second user 102. The messaging server 103 is also configured for interacting with the translator 104 for getting a message translated from one language to another. The interworking server 602 is configured for converting a communication request (e.g., an SIP request) received from the messaging server 103 to a communication request using an API of the social network 601 to which the converted communication request has to be delivered. In the reverse path, the interworking server converts an API communication request from the social network 601 to a communication request (e.g., an SIP request), which the messaging server understands.

Figure 7:
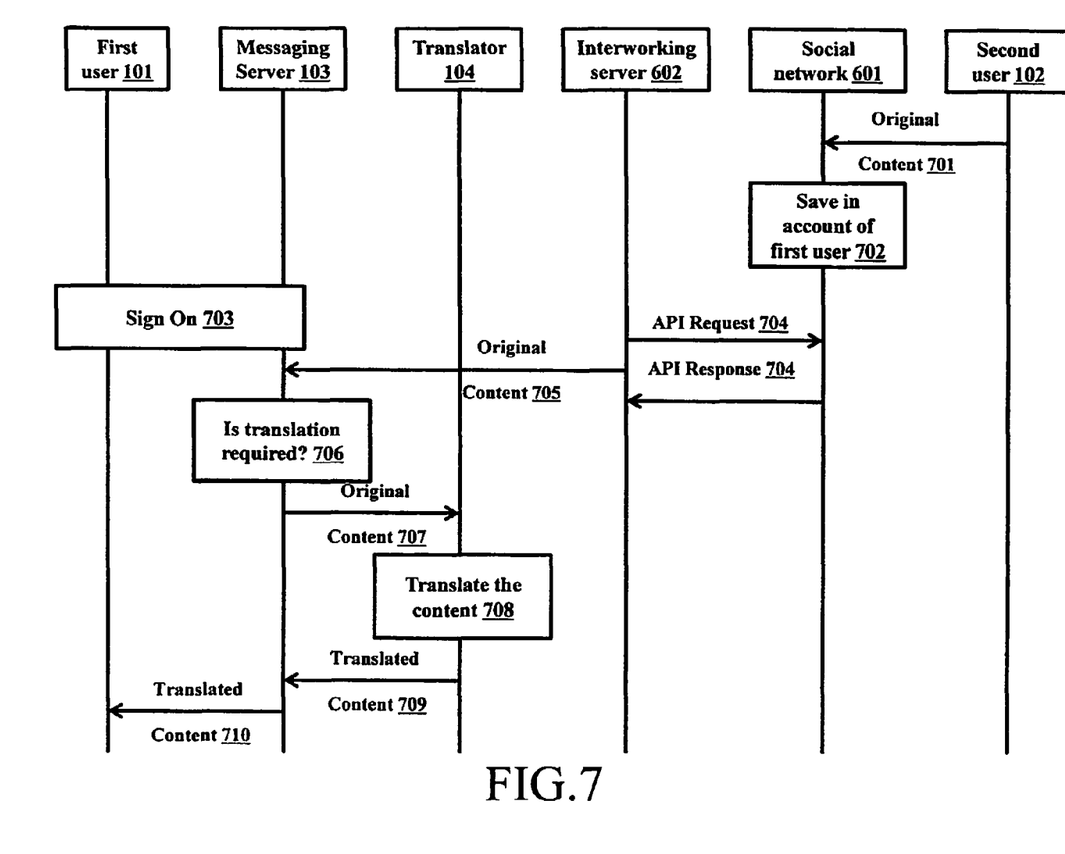
FIG. 7 is a sequence diagram illustrating a user in a social network sending a message to a user in an RCS, according to an embodiment of the present invention.

FIG. 7 is a sequence diagram illustrating a user in a social network sending a message to a user in an RCS, according to an embodiment of the present invention. The second user 102 sends a message to the first user 101, in step 701. The request used to deliver from the second user 102 to the social network 601 varies from one social network provider to another. For example, the second user 102 sends a direct message to the first user 101 in English using twitter. Once the social network 601 receives the message from the second user 102, the social network 601 saves the message in the account of the first user 101, in step 702. The first user 101 signs on to the RCS service, which includes logging into the social network, in step 703. The messaging server 103 sends a sign-on request to the social network 601 via the interworking server 602 to access the account of the first user 101 on the social network 601, in steps 704 and 705. For example, the interworking server 602 uses authentication API in order to access a users account. The messaging server 103 retrieves the messages intended for the first user 101 via the interworking server 602, which uses the APIs of the relevant social network, in step 705. For example, the interworking server may use direct method APIs for getting the list of recent messages sent to the authenticating user. The retrieved message is then converted by the interworking server into a format that the messaging server 103 understands. For example, the XML message is converted to an SIP message format. The interworking server 602 also includes the indication of language used by social networking user, e.g., a new parameter "lang" in the header of the message e.g., in the "From" header of the SIP message— From: Alice <sip:alice@atlanta.com>lang=en. The messaging server 103 then determines whether the message that has been retrieved from the social network 601 needs language translation, in step 706. If the message requires translation, the messaging server 103 sends the message to the translator 104, in step 707. The translator 104 performs the translation, in step 708, and sends the translated message back to the messaging server 103, in step 709. The messaging server 103 then sends the translated message to the first user 101, in step 710.

Figure 8:
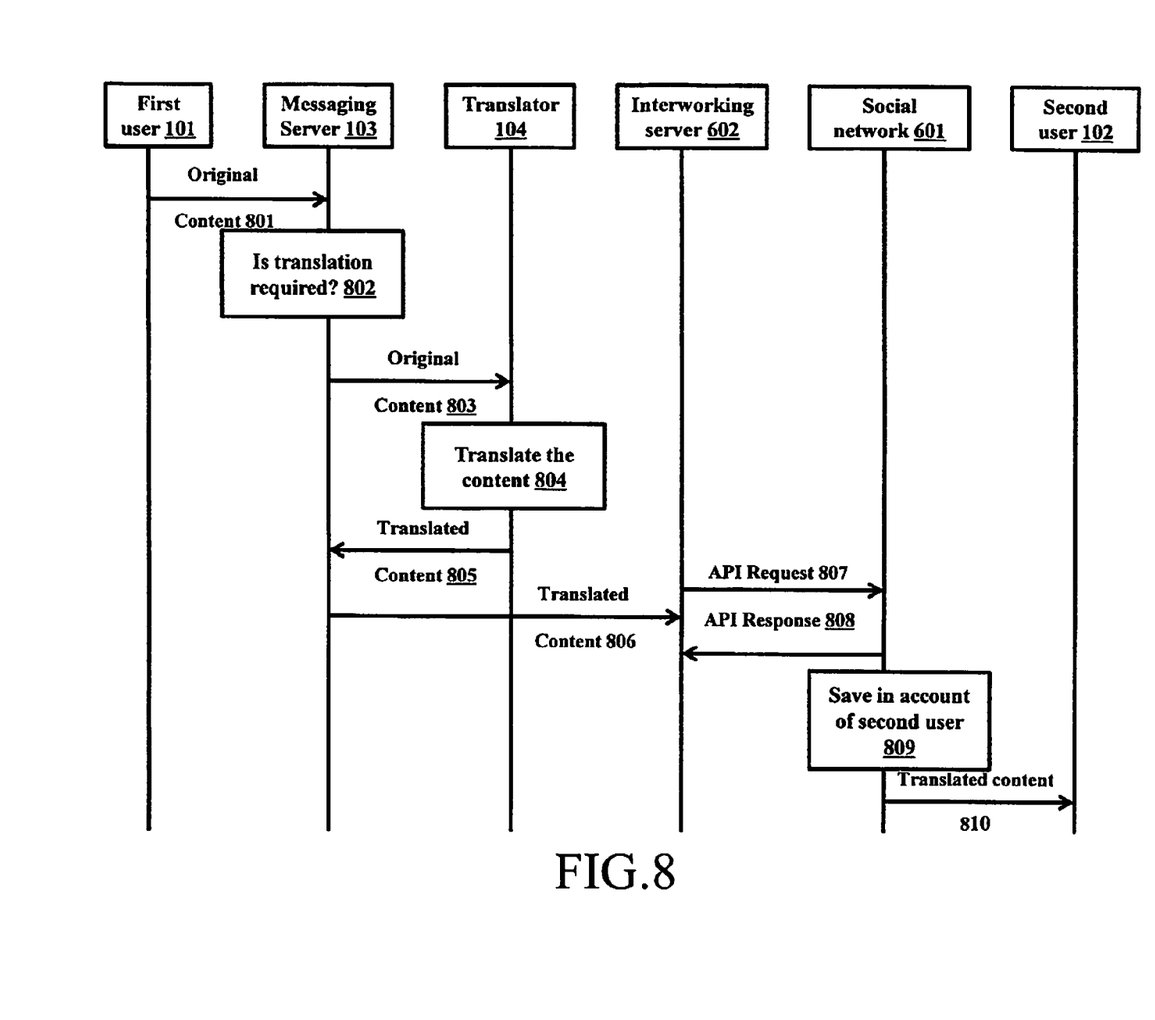
FIG. 8 is a sequence diagram illustrating a user in an RCS sending a message to a user in a social network, according to an embodiment of the present invention.

FIG. 8 is a sequence diagram illustrating a user in an RCS sending a message to a user in a social network, according to an embodiment of the present invention. The first user 101 sends a message to the second user 102, in step 801. The message server 103, upon receipt of the message, determined whether the message is to be translated, in step 802. If the message is to be translated, the message server 103 sends the message to the translator 104, along with the necessary instructions, in step 803. The translator 104 translates the message into the desired language, in step 804, and sends the translated message to the message server 103, in step 805. The message server 103 then sends the translated message to the second user 102 via the interworking server and the social network, in steps 806, 807 and 808. The social network 601 saves the message in the account of the second user 102, in step 809, before delivering the message to the second user 102, in step 810.

The embodiments of the present invention described herein can be implemented through at least one software program running on at least one hardware device and performing network management functions to control the network elements. The network elements shown in FIGS. 1, 2 and 6 include blocks that can be at least one of a hardware device, or a combination of hardware device and software module.

The embodiments of the present invention described herein specify a translation feature to enhance the communication experience between users of RCS and non-RCS systems by enabling users to communicate in their preferred language with the RCS taking care of language translation. Therefore, it is understood that the scope of protection is extended to such a program and in addition to a computer readable means having a message therein. Such computer readable storage means contain program code means for implementation of one or more steps of the method, when the program runs on a server, mobile device, or any suitable programmable device. The method is implemented in a preferred embodiment through or together with a software program written in, for example, Very high speed integrated circuit Hardware Description Language (VHDL), or another programming language, or is implemented by one or more VHDL or several software modules being executed on at least one hardware device. The hardware device can be any kind of device which can be programmed including, for example, any kind of computer, such as, a server, a personal computer, or the like, or any combination thereof, e.g., one processor and two FPGAs. The device may also include means which could be, for example, hardware means, such as, an ASIC, or a combination of hardware and software means, e.g., an ASIC and an FPGA, or at least one microprocessor and at least one memory with software modules located therein. Thus, the means are at least one hardware means and/or at least one software means. The embodiments of the present invention described herein could be implemented in pure hardware or partly in hardware, and partly in software. The device may also include only software means. Alternatively, the invention may be implemented on different hardware devices, e.g., using a plurality of CPUs.

While the invention has been shown and described with reference to certain embodiments thereof, it will be understood by those skilled in the art that various changes in form and detail may be made therein without departing from the spirit and scope of the invention as defined by the appended claims.

The invention claimed is:

1. A method for translating a message sent from a first user in a rich communication service (RCS) to a second user in a non-RCS, the method comprising the steps of:
   identifying a language of the message received from the first user at a server in the RCS;
   storing the identified language into a language history table with an entry of the first user;
   identifying whether a preferred language of the second user is present in the language history table;
   obtaining the preferred language from the language history table, when the preferred language is present in the language history table;
   obtaining the preferred language from a language history of the second user and storing the preferred language in the language history table with an entry of the second user, when the preferred language is not present in the language history table; and
   translating the message into the preferred language at a translator,
   wherein the language history of the second user is obtained by using at least one of an application programming interface (API) and a network to network interface (NNI).

2. The method, as claimed in claim 1, wherein the message is at least one of:
   an email;
   a social networking message;
   an instant messaging (IM) message;
   a voice message; and
   a video message.

3. The method, as claimed in claim 1, wherein the language history table comprises fields for:
   an identity of the first user;
   a language used by the first user;
   an identity of the second user; and
   a preferred language of the second user.

4. The method, as claimed in claim 1, wherein the second user is a group of users.

5. The method, as claimed in claim 4, wherein the language history table comprises fields for:
   an identity of the first user;
   a language used by the first user;
   an identity of the group of users; and
   a preferred language of the group of users.

6. The method, as claimed in claim 1, wherein identifying whether the preferred language of the second user is present in the language history table comprises:
   determining whether instructions for translation are present in the message;
   extracting the preferred language from the message.

7. The method, as claimed in claim 1, wherein the server determines whether the identified language and the preferred language match, sends the message from the server to the second user when the identified language and the preferred language match, sends the message from the server to the translator when the identified language and the preferred language do not match and sends the message, the identified language and the preferred language to the translator.

8. The method, as claimed in claim 1, wherein the server sends details of translation as metadata with the message to the second user.

9. A method for translating a message sent from a first user in a non-rich communication service (RCS) to a second user in an RCS, the method comprising the steps of:
   identifying a language of the message received from the first user at a server of the RCS;
   storing the identified language into a language history table with an entry of the first user;
   identifying whether a preferred language of the second user is present in the language history table;
   obtaining the preferred language from the language history table, when the preferred language is present in the language history table;
   obtaining the preferred language from a language history of the second user and storing the preferred language into the language history table with an entry of the second user, when the preferred language is not present in the language history table; and
   translating the message into the preferred language at a translator,
   wherein the language history of the second user is obtained by using at least one of an application programming interface (API) and a network to network interface (NNI).

10. The method, as claimed in claim 9, wherein the message is at least one of:
    an email;
    a social networking message;
    an instant messaging (IM) message;
    a voice message; and
    a video message.

11. The method, as claimed in claim 9, wherein the language history table comprises fields for:
    an identity of the first user;
    a language used by the first user;
    an identity of the second user; and
    a preferred language of the second user.

12. The method, as claimed in claim 9, wherein the second user is a group of users.

13. The method, as claimed in claim 12, wherein the language history table comprises fields for:
    an identity of the first user;
    a language used by the first user;
    an identity of the group of users; and
    a preferred language of the group of users.

14. The method, as claimed in claim 9, wherein the server determines whether the identified language and the preferred language match, sends the message from the server to the second user when the identified language and the preferred language match, sends the message from the server to the translator when the identified language and the preferred language do not match and sends the message, the identified language and the preferred language to the translator.

15. The method, as claimed in claim 9, wherein the server sends details of translation as metadata with the message to the second user.

16. A system for translating a message sent users in a rich communication service (RCS) and a non-RCS, the system comprising:
- a server in the RCS for identifying a language of the message received from a first user, storing the identified language into a language history table with an entry of the first user, identifying whether a preferred language of a second user is present in the language history table, obtaining the preferred language from the language history table when the preferred language is present in the language history table, and obtaining the preferred language from a language history of the second user and storing the preferred language in the language history table with an entry of the second user when the preferred language is not present in the language history table; and
- a translator for translating the message into the preferred language,
- wherein the language history of the second user is obtained by using at least one of an application programming interface (API) and a network to network interface (NNI).

\* \* \* \* \*